April 11, 1967 TORU OHNO 3,313,888
SPLIT-SWITCH CROSSBAR TRUNKING SYSTEM
Filed May 13, 1963 14 Sheets-Sheet 12

Fig. 12.

INVENTOR
TORU OHNO

April 11, 1967 TORU OHNO 3,313,888
SPLIT-SWITCH CROSSBAR TRUNKING SYSTEM
Filed May 13, 1963 14 Sheets-Sheet 13

Fig. 13.

INVENTOR
TORU OHNO

BY
ATTORNEY

Fig.14.

United States Patent Office 3,313,888
Patented Apr. 11, 1967

3,313,888
SPLIT-SWITCH CROSSBAR TRUNKING
SYSTEM
Toru Ohno, Yokohama, Japan, assignor to Hitachi Limited, Tokyo, Japan, a corporation of Japan
Filed May 13, 1963, Ser. No. 279,856
Claims priority, application Japan, May 15, 1962, 37/19,166; May 23, 1962, 37/20,410
2 Claims. (Cl. 179—22)

The present invention relates generally to crossbar switching systems, more particularly to switch frames in such systems.

Switch frames generally consist of many crossbar switches and links connecting such crossbar switches together, and under the control of various common control equipments, such as markers, registers, etc., form channels, each of which interconnects any one of incoming lines and outgoing lines. In other words, each channel comprises the crosspoints of some crossbar switches and the links among such switches.

Therefore, the link arrangement in such switch frames has a great effect on channel selection by the common control equipments, and the necessary number of switches and other equipments in such switching systems.

The main object of the invention is to provide new and useful switch frames, in order to obtain a more economical crossbar switching system.

Another object of the invention is to improve switching systems by reducing the number of switches or links in switch frames.

Further object of the invention is to improve utilization or efficiency of the links.

It is still another object of the invention to reduce the total number of trunks which are connected to link extensions of some links in switch frames.

The main feature of the invention will be explained by a crossbar switching system of the type which includes switch frames, line link frames and trunk link frames, and originating trunks and terminating trunks connecting these two kinds of frames. In this system, each line link frame consists of three groups or stages of switches, namely, primary switches, secondary switches and tertiary switches, and two groups of links, or primary links and secondary links among respectively, the primary-secondary switches, and the secondary-tertiary switches. The tertiary switches are divided into two sub-groups, namely, originating tertiary switches and terminating tertiary switches. Originating tertiary switches reach originating registers. Further, each secondary link connected to an originating tertiary switch has a link extension to the aforesaid originating trunk.

Since in conventional systems, the number of links available for selecting a channel via one of secondary switches, is the same in both cases of originating calls and terminating calls, many more switches or links and, moreover, originating trunks are needed.

The main feature of the invention is found in the secondary switches. Each secondary switch consists of an upper half and lower half, and the lower half is centrally divided.

Another feature of the invention resides in such a link arrangement that the number of links available for selecting a channel via one of the secondary switches is different according to the type of call, i.e., originating call or terminating call.

The above and other objects and features of the invention may be more clearly understood from an examination of the following description and attached drawings, in which:

FIGS. 1 and 2 when arranged in accordance with FIG. 15 show a block diagram of an automatic switching system embodying the invention, which includes a link frame, a trunk link frame, and control means related thereto;

FIGS. 3 to 14 when arranged in accordance with FIG. 16 show a detailed link arrangement of the line link frame shown in FIG. 1;

FIG. 15 is a diagrammatic illustration of a manner in which FIGS. 1 and 2 are related to each other; and FIG. 16 is a similar diagrammatic illustration to FIG. 15 showing the manner in which FIGS. 3 to 14 are related to each other.

Figures 1, 15:
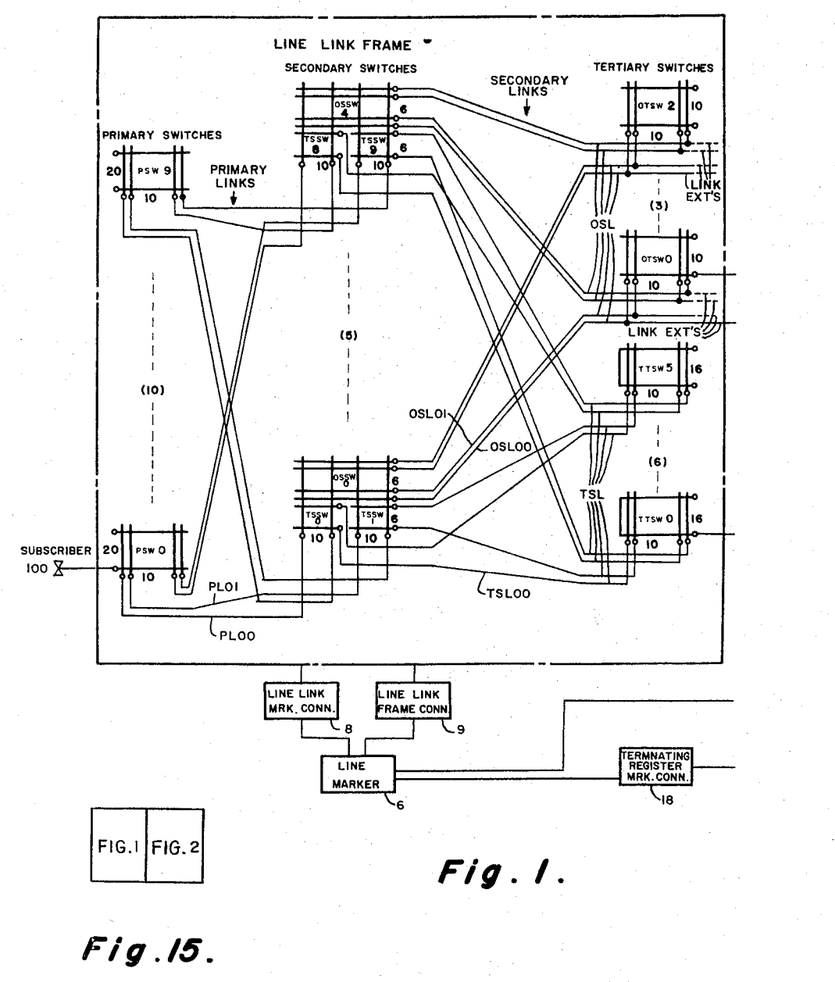
Figure 2:
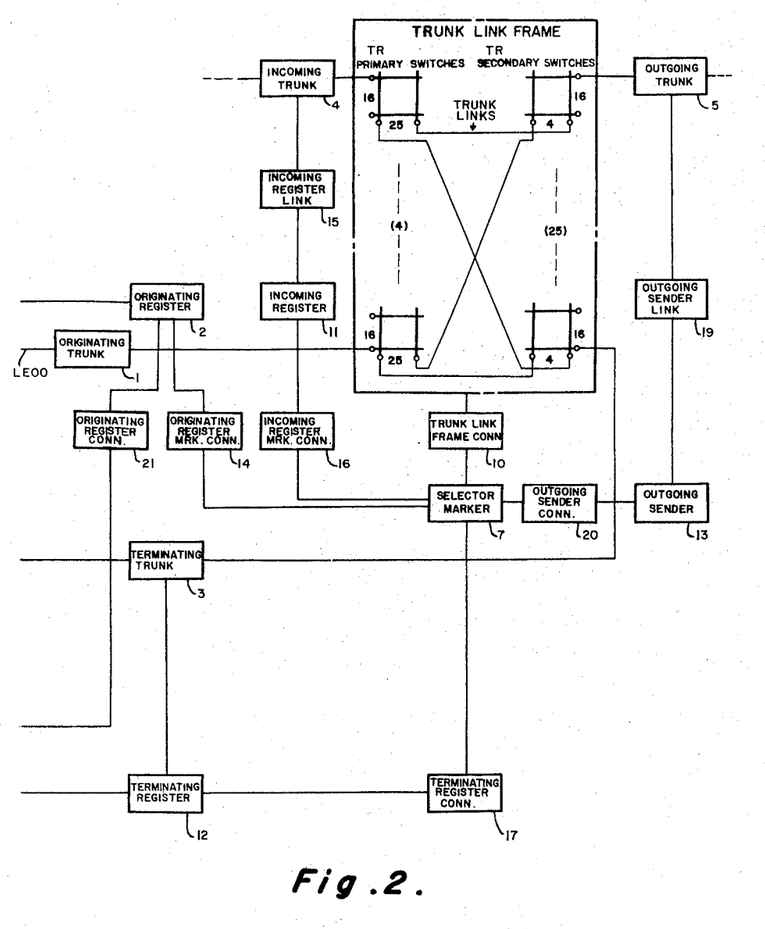
Figures 3, 16:
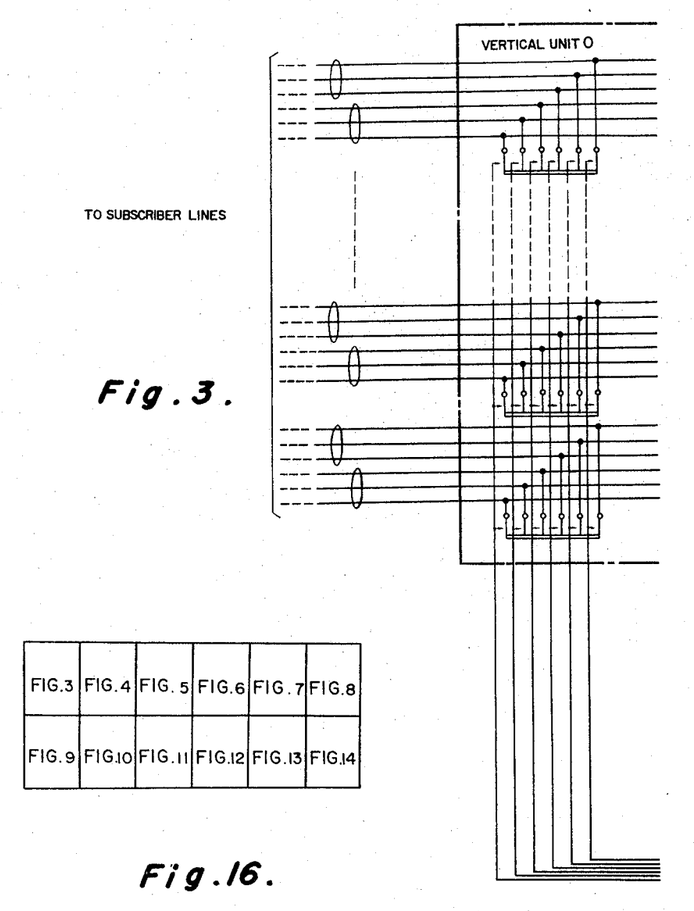
Figure 4:
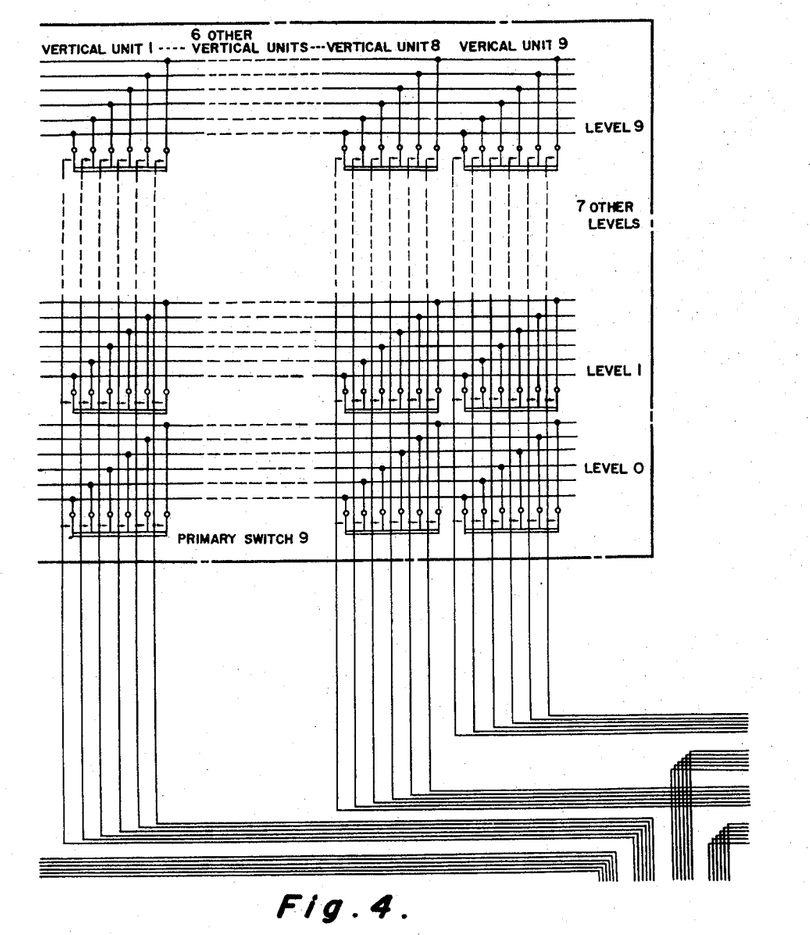
Figure 5:
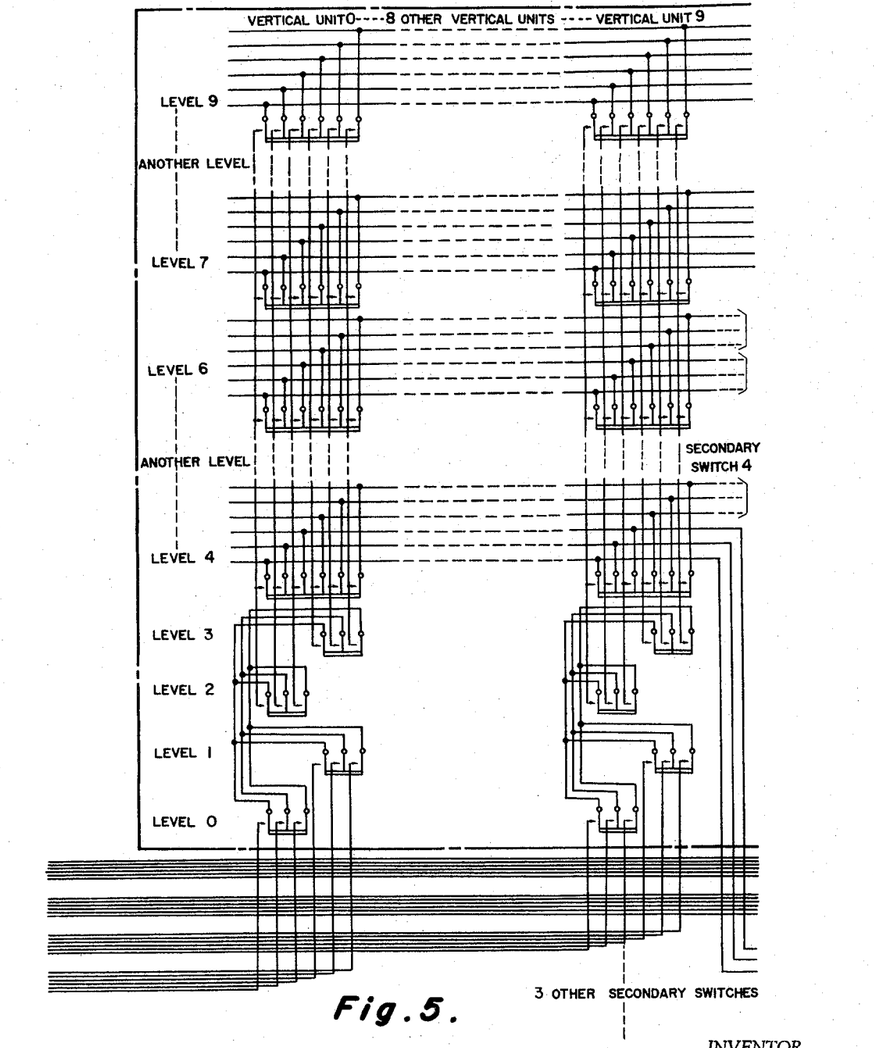
Figure 6:
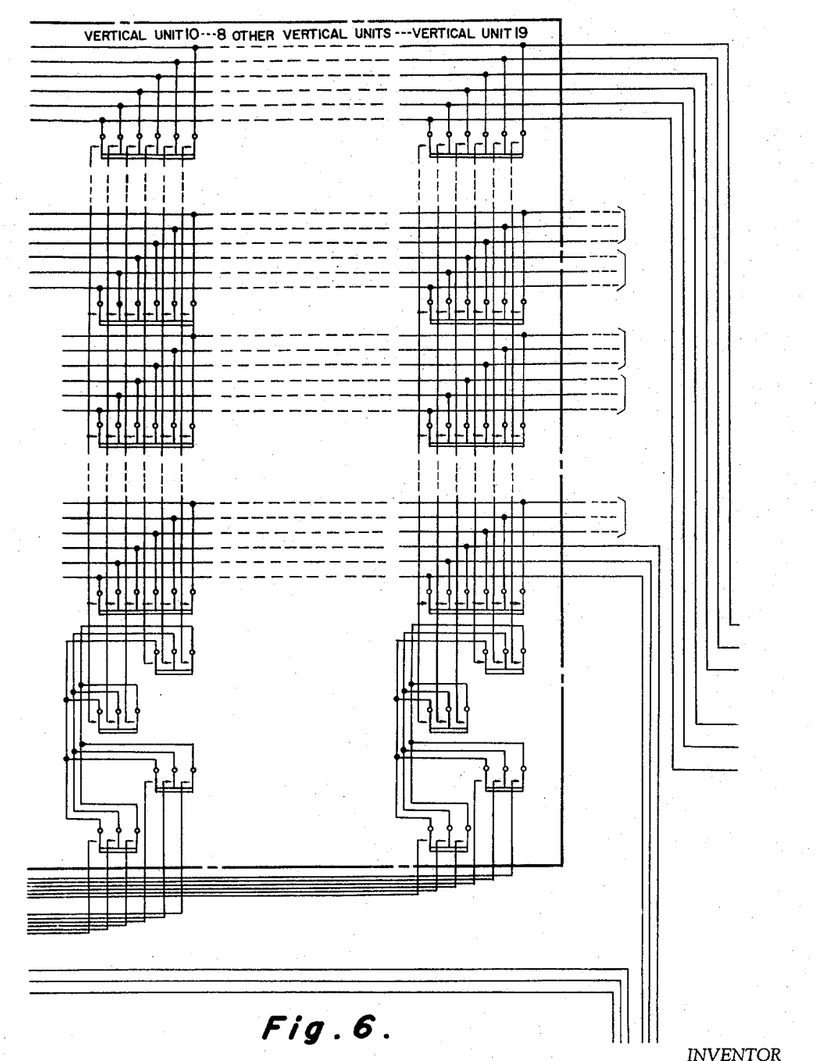

Referring to FIGS. 1 and 2, the outline of a line link frame and a trunking scheme according to the invention will be described first. For simplicity, only one line link frame is shown in the figures, but it is permissible to provide a plurality of such line link frames interconnected with a plurality of trunk link frames to meet the actual needs. In this particular embodiment of the invention, each line link frame consists of nineteen crossbar switches arranged in three stages, namely, ten primary line switches, five secondary line switches, and nine tertiary line switches. Primary and secondary line links are provided to connect the primary line switches to the secondary line switches and to connect the secondary line switches to the tertiary line switches respectively. Each of the primary line switches PSW0 to PSW9 has twenty horizontals connected to individual subscriber lines, for example the lowest horizontal switch PSW0 being connected to the subscriber 100, and ten verticals connected to individual primary line links, for instance the first and second verticals of switch PSW0 counted from the extreme left being connected to primary line link PL00 and PL01 respectively. Each secondary line switch has twelve horizontals and twenty verticals, and the upper half of each secondary switch including its upper six horizontals is used as an originating secondary switch such as OSSW0 of the first secondary line switch, while its lower half including its lower six horizontals is further divided vertically into two sections. Each such section is used as a terminating secondary switch, such as TSSW0 or TSSW1 of the first secondary line switch. The first ten verticals of the twenty verticals of each secondary line switch extend through its originating secondary switch and one of its terminating secondary switches, such as OSSW0 and TSSW0 in case of the first secondary line switch, while the remaining ten verticals extend through the same originating secondary switch and the other one of its terminating secondary switches, such as OSSW0 and TSSW1.

The connection of the primary links is such that each primary switch is connected to every one of the secondary terminating switches by linking verticals of those switches, for example, the extreme left two verticals (FIG. 1) of the primary switch PSW0 are connected to the extreme left vertical of the terminating secondary switch TSSW0 and to the corresponding extreme left vertical of the switch TSSW1 respectively through primary links PL00 and PL01. In other words, there are two primary links between each primary switch and each originating secondary switch, such as links PL00 and PL01 between switches PSW0 and OSSW0.

There are nine tertiary switches consisting of two sub-groups of switches, namely, three originating tertiary switches OTSW0 to OTSW2 and six terminating tertiary switches TTSW0 to TTSW5. Each originating tertiary switch has ten horizontals and ten verticals, while each terminating tertiary switch has sixteen horizontals and ten verticals.

There are two kinds of secondary line links, namely originating secondary line link OSL and terminating secondary line links TSL. The connection of the originating secondary links OSL's is such that two horizontals of each originating secondary switch are connected with two verticals of an originating tertiary switch, and hence, there are two originating secondary line links OSL's provided between each secondary line switch and each originating tertiary line switch, such as line links OSL00 and OSL01 between switches OSSW0 and OTSW0.

On the other hand, each of the terminating secondary switches TSSW0 to TSSW9 is connected with each of the terminating tertiary switches TTSW0 to TTSW5 through only one terminating secondary line link, such as a line link TSL00 between a horizontal of the terminating secondary switch TSSW0 and a vertical of the terminating tertiary switch TTSW0. Each originating secondary line link has a link extension, such as a line link extension LE00 of the aforementioned link OSL00, which is extended to an originating trunk 1 (FIG. 2).

There are a plurality of originating registers 2 connected with individual horizontals of the originating tertiary line switches, however, for simplicity one of them is shown in FIG. 2. A plurality of terminating trunks 3 are connected to individual horizontals of the terminating tertiary switches, however, only one of them is shown in the figure. Each originating trunk 1 consists of normally open contacts controlled by a hold magnet of the originating tertiary switch, as will be described in detail hereinafter.

In other words, the horizontals of the originating secondary line switches are connected with the originating registers controlled by hold magnets of tertiary line switches, and when the holding magnets are energized, the above-mentioned horizontals of the originating secondary line switches are extended to and connected with the trunk link frame through the originating trunks, as shown in FIG. 2.

As described in the foregoing there are other line link frames to be connected with the switching means of FIG. 2, and horizontals of tertiary switches of such other line link frames are also connected with the above-mentioned originating registers and terminating trunks in parallel with corresponding horizontals of the figure. The number of such line link frames to be used in a telephone switching system is determined by considering the communications traffic condition.

Each trunk link frame consists of four primary trunk switches and twenty-five secondary trunk switches, and trunk links connecting the primary and secondary trunk switches. Each primary trunk switch has sixteen horizontals and twenty-five verticals, and each secondary trunk switch has sixteen horizontals and four verticals. The horizontals of each of the primary trunk switches are connected with originating trunks or incoming trunks, for example the top horizontal of the uppermost primary trunk switch (FIG. 2) is connected with an incoming trunk 4. The horizontals of the secondary trunk switches are connected with the outgoing trunks 5, or with terminating trunks 3, or other special trunks such as tone trunk (not shown).

Each primary trunk switch is connected with every one of the secondary trunk switches through trunk links. The trunk appearances, namely, the horizontals of the secondary trunk switches of the trunk link frame are connected with appearances of other trunk link frames (not shown). The number of such trunk appearances can be increased, if necessary, by using additional secondary trunk switches connected in a similar manner to the connection of the secondary trunk switches shown in FIG. 2.

All switching operations of the switching system of FIGS. 1 and 2 are controlled by suitable control means, such as a line marker 6, a selector marker 7, a variety of connectors, and other related equipments. Each line link frame has an individual line link frame connector 9, a line link marker connector 8 controlled by the line link frame so as to connect the line link frame with the line marker 6. The line link frame connector 9 is also controlled by the line marker 6 so as to connect the line marker 6 with the line link frame. Each trunk link frame has an individual trunk link frame connector 10, by which the selector marker 7 obtains access to the associated trunk link frame.

To assist the markers and to shorten the time during which they have to be employed with each call, the originating registers, and incoming registers, terminating registers and outgoing senders, such as 11, 12 and 13, respectively are employed for receiving or transmitting the numerical designations of the called subscribers. Originating registers 1 are connected with the calling subscriber line via the line link frame under the control of the line marker in response to an originating call. An originating register marker connector 14 is employed to connect any one of a group of originating registers with any idle selector marker. Incoming registers are attached to incoming trunks over an incoming register link 15 and are arranged to receive the numerical designations from the distant office, different incoming registers being employed to receive dial pulses or multi-frequency pulses according to the nature of the distant office and different links being employed to connect the different types of registers with their associated trunks. An incoming register marker connector 16 is employed to connect any one of a group of incoming registers with any idle selector marker. Terminating registers are used to transmit called subscriber's numerical designations from selector marker to line marker. A terminating register connector 17 is employed to connect the selector marker 7 with the terminating register 12. A terminating register marker connector 18 is employed to connect any one of a group of terminating registers with any idle line marker. The line link marker connectors and terminating register marker connectors are arranged in predetermined order in a preference chain with line marker. The originating register marker connectors and incoming register marker connectors are arranged in predetermined order in a preference chain with selector marker.

Outgoing trunks to offices requiring the transmission of the called subscribers' numbers are connected with outgoing senders by means of an outgoing sender link 19. These outgoing senders are also of a plurality of types in accordance with the type of pulsing required by the distant office and are selected by the selector marker 7 through an outgoing sender connector 20 in accordance with the type of the trunk selected.

In general, calls in an office of this type may be classified as intraoffice calls, outgoing calls and incoming calls.

When a subscriber originates a call, the line link frame engages an idle line marker, for example a line marker 6 over the line link marker connector 8 and identifies itself to the line marker 6, the connector informing the line marker that a connection to an idle originating trunk 1 is to be established. The line marker 6 now proceeds to select an idle originating register 2 and connects to it through originating register connector 21. As soon as the originating trunk 1 has been seized, the line marker 6 connects with the line link frame through the line link frame connector 9 and completes the identification of the calling subscriber line, a part of which was obtained through the line link marker connector 8. When an idle originating register 2 has been seized, the marker 6 selects one of five combinations of channels which may be used to connect the calling subscriber with the originating register 2, operates the select and hold magnets of the switches to complete the channel, and releases. The subscriber then dials the wanted subscriber number into the originating register 2.

When registration has been completed, the originating register 2 seizes an idle selector marker 7 through the originating register marker connector 13 and transmits to the marker 7 the dialed number. From the office code the selector marker 7 determines whether an intraoffice call is desired or an outgoing call.

As soon as the selector marker 7 has been seized from the originating register 2, the selector marker connects through the trunk link frame connector 10 with the trunk 1 link frame, on which the originating trunk is located.

Assuming that an intraoffice connection is indicated, the selector marker 7 tests simultaneously for both an idle terminating trunk 3 and an idle channel which may be used to inter-connect the terminating trunk 3 and the originating trunk 1. The selector marker 7 then selects an idle terminating register 12, connects the terminating trunk 3 with the terminating register 12, connects itself with the terminating register 12 through the terminating register connector 17, transfers the called subscriber number to the terminating register 12, sets up a connection between the originating trunk 1 and the terminating trunk 3, informs the terminating register 12 to seize the line marker 6, and then releases the originating register 2 and itself. When the originating register 2 is released, it releases the originating tertiary switch of the line link frame, the release of the switch extends the originating secondary link of the line link frame to the originating trunk 1, and the channel in the line link frame will be held by the terminating trunk 3 via the trunk link frame and the originating trunk 1.

After the receiving of the information to seize the line marker 6, the terminating register 12 connects with the line marker 6 through the terminating register marker connector 18 and transmits the called subscriber number to the line marker 6. Then the line marker 6 seizes the line link frame on which the called subscriber line appears. The line marker 6 interconnects the terminating trunk and the called subscriber line over an idle channel being in the line link frame, releases the terminating register 12 and itself leaving the ringing and supervision under the control of the terminating trunk 2.

In case of an outgoing call, when the originating register 1 seizes the selector marker 7, the selector marker 7 learns from the office code whether or not a sender is required and, if so, selects an idle outgoing sender 13 of the proper type to transmit the called subscriber number to the distant office, selects an idle outgoing trunk 5 to the distant office, connects the trunk 5 with the sender 13 over the outgoing sender link 1, connects itself with the sender 13 through the outgoing sender connector 20 and transfers the called subscriber number to the sender 13. The selector marker 7 then sets up a connection between the originating trunk 1 and the outgoing trunk 5 and releases the originating register 2 and itself. The outgoing sender 13 then transmits the required number of digits to the distant office and releases.

An incoming call from a distant office causes the seizure of an incoming trunk 4 which responds by connecting to an incoming register 11 through the incoming register link 15. The distant office transmits the numerical designation of the called subscriber to the incoming register 11. The register 11 also records the trunk link frame number, seizes an idle selector marker 7 through incoming register marker connector 14 and transmits that number to the selector marker 7, in response to which the selector marker 7 seizes the trunk link frame on which the incoming trunk 4 appears. The succeeding operation is almost similar to that of an intraoffice call, the selector marker 7 connects the incoming trunk 4 to an idle terminating trunk 2, and then the line marker 6 connects the terminating trunk to the called subscriber line.

The structure of the above said line link frame will now be explained more in detail according to an embodiment shown in FIGS. 3 to 14, in which all of the switches are modified six-wire crossbar switches.

For the ten primary switches, five six-wire crossbar switches are used. Each of these crossbar switches has ten horizontals, twenty verticals and six make contacts in each crosspoint, and is centrally severed to give two primary switches of ten verticals. Thus each of the primary switches PSW0 to PSW9 consists of six-wire crossbar switch having ten horizontals and ten verticals. The splitting of crosspoints of primary switches is effected by the secondary switches. Therefore, each of the primary switches PSW0 to PSW9 can be used as three-wire crossbar switch having twenty horizontals and ten verticals. For a detailed explanation of the method of splitting the crosspoints of the primary crossbar switches by the secondary crossbar switches, reference should be made to the United States patent application "Method of Splitting Crosspoint of Crossbar Switch and Crossbar Switch Therefore," filed on April 23, 1963, Ser. No. 274,980.

Each secondary switch consists of a six-wire crossbar switch having ten horizontals, twenty verticals, and six make contacts in each crosspoint. As already described, it accommodates one originating secondary switch OSSW and two terminating secondary switch units TSSW.

Figure 11:
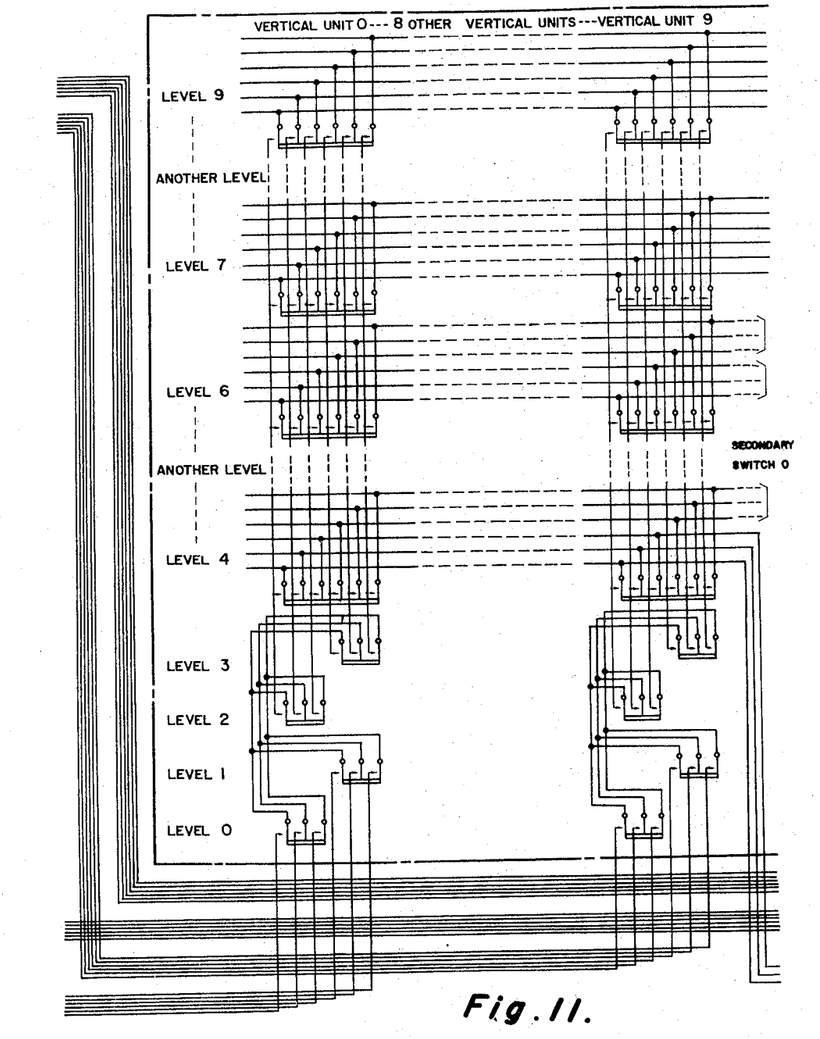
Figure 12:
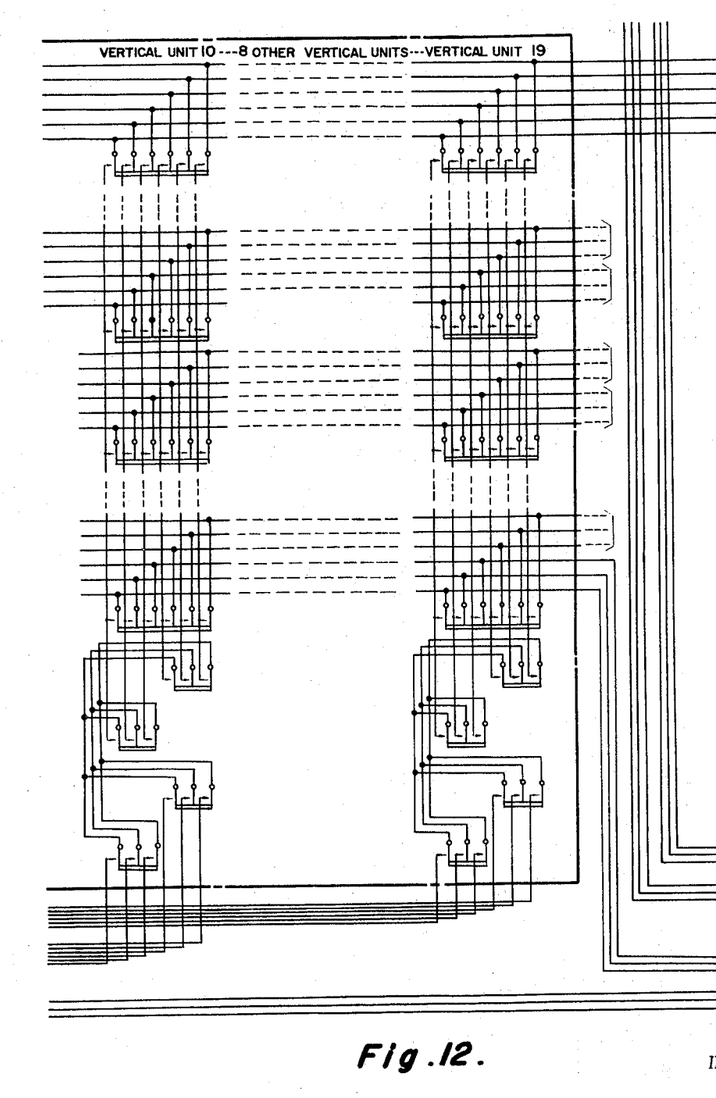
Figure 13:
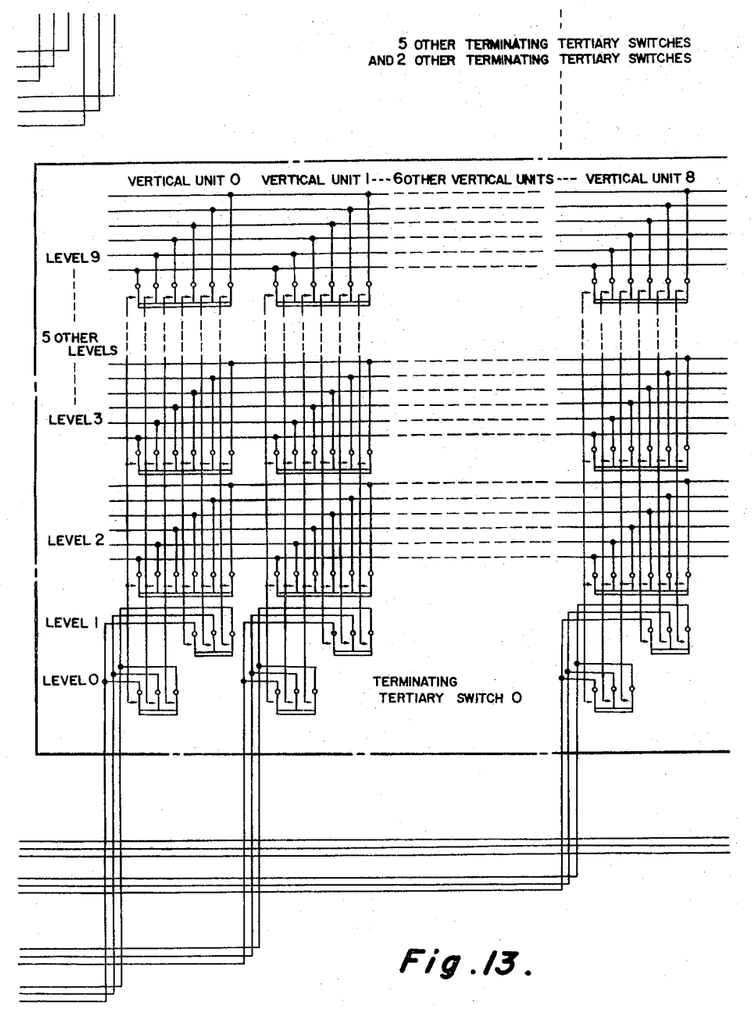
Figure 14:
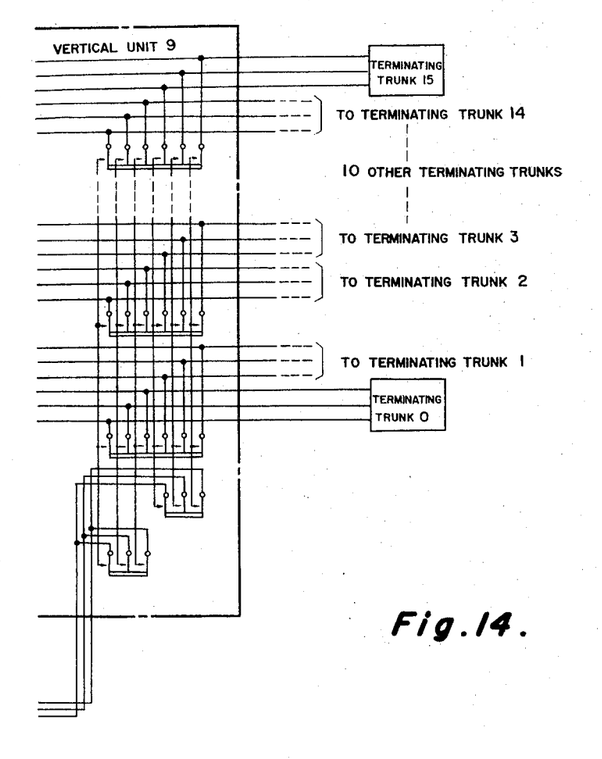

An embodiment of the secondary crossbar switch is illustrated in detail in FIGS. 11 to 12. Among ten horizontal levels of the secondary switch, three horizontal levels 7, 8 and 9 are connected to the originating secondary links, and three horizontal levels 4, 5 and 6 are connected to the terminating secondary links, and two horizontal levels 2 and 3 are used for the splitting of the secondary switches and two remaining horizontal levels 0 and 1 are used for the splitting of the primary switches. And the horizontal multiple connection of the secondary crossbar switches are carried out as follows, that is, levels 7, 8 and 9 to be used for the originating secondary links are multipled throughout all of the 20 verticals and levels 4, 5 and 6 to be used for the terminating secondary links are divided into two groups each multipled for 10 verticals and the levels, 0, 1, 2 and 3 are not horizontally multipled since these levels are used for the splitting purpose of the crosspoints. Thus, one crossbar switch used as the secondary switch is equivalent to one three wire switch having twenty vertical and six horizontals in case of originating call and six horizontals in case of terminating call. To the verticals of the secondary switch are connected the primary links and to the horizontal paths are connected the secondary links.

Figure 7:
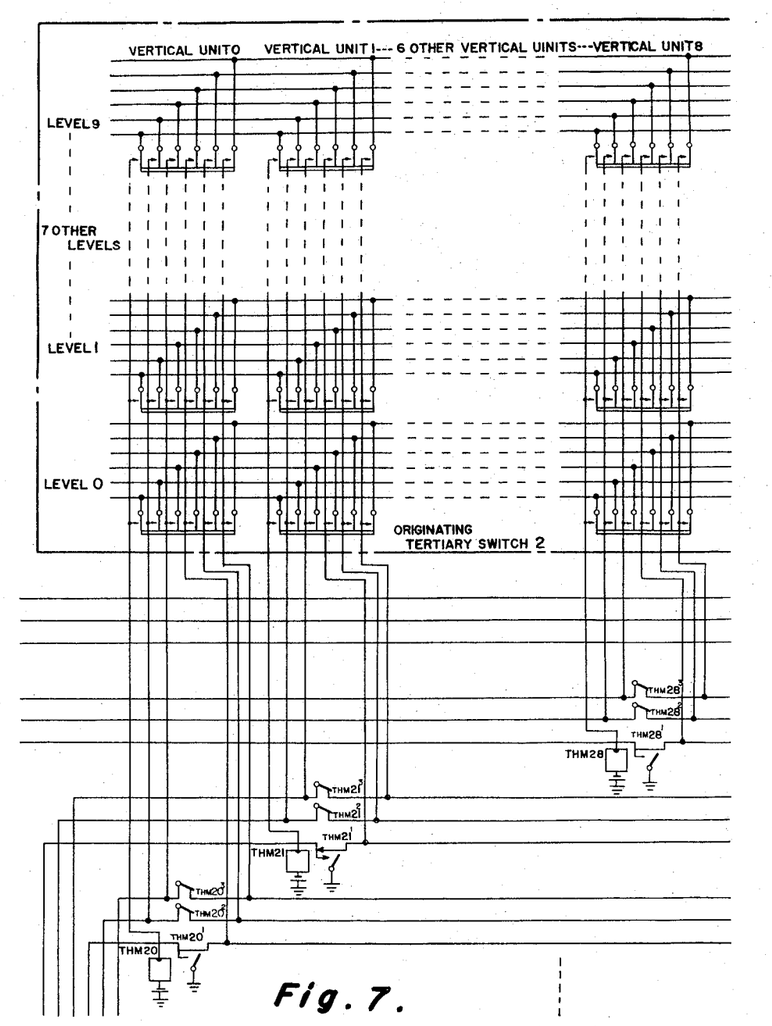
Figure 8:
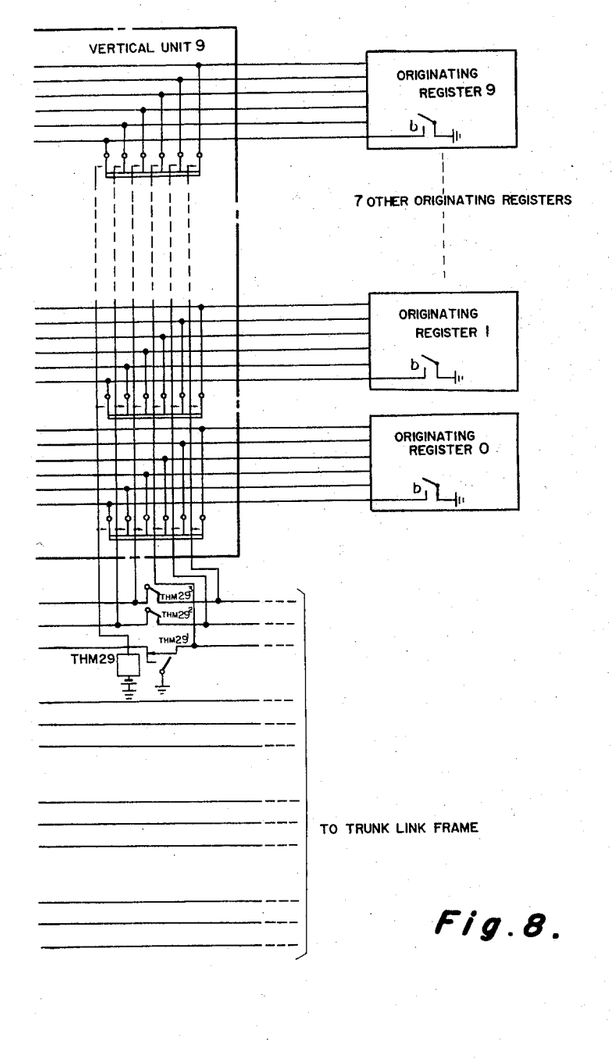
Figure 9:
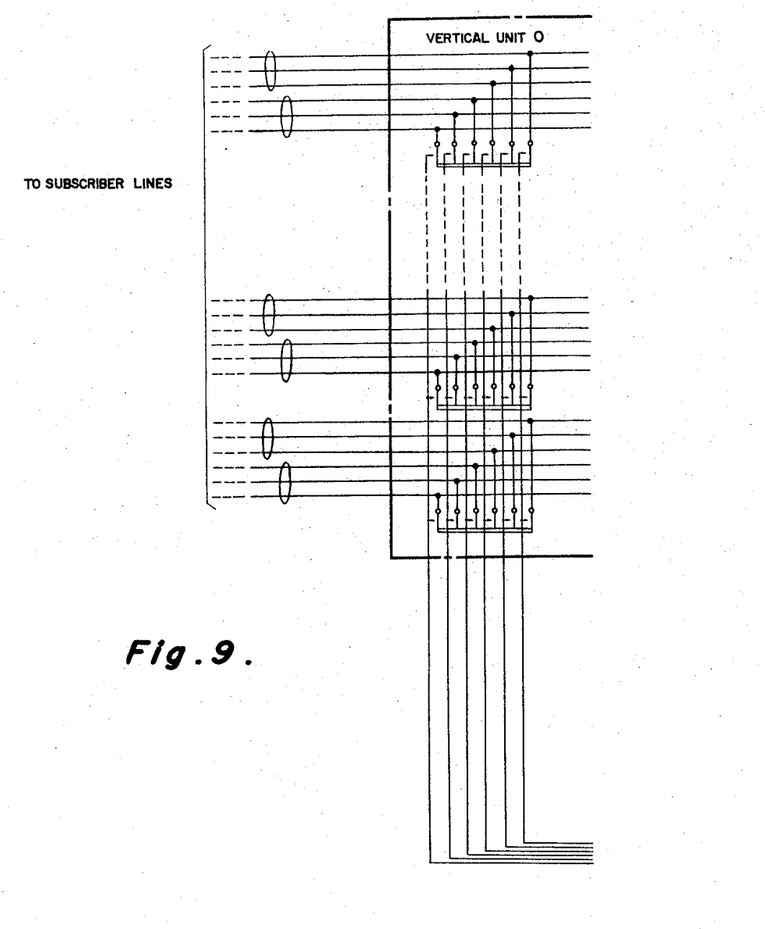
Figure 10:
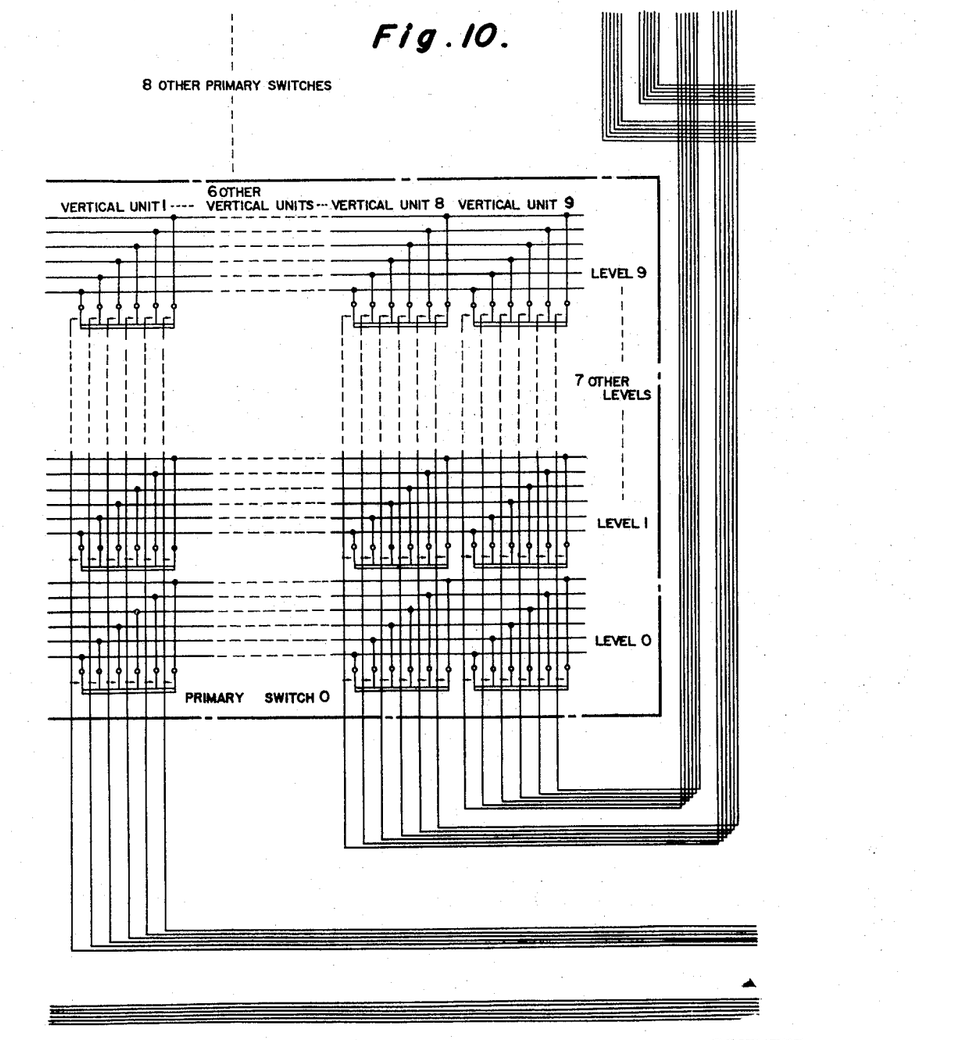

One six-wire crossbar switch having ten horizontals, twenty verticals and six make contacts in each crosspoint, is employed for two originating tertiary switches. The crossbar switch has its horizontal multiples cut so as to give the equivalent of two crossbar switches of ten verticals each of which is used as an originating tertiary switch. Thus each of the originating tertiary switches OTSW0 to OTSW2 consists of six-wire crossbar switch having ten horizontals and ten verticals. An example of such originating tertiary switch is shown in FIGS. 7 and 8. The horizontals of the originating tertiary switch are connected to originating registers while the verticals are connected to originating secondary links which are arranged so that there are two originating secondary links connecting each originating secondary switch with each originating tertiary switch.

As already described, originating secondary links have a function of changing-over the horizontals of the originating secondary switch to the originating tertiary switch via the originating trunk, the trunk link frame and the originating trunk consists of the normally-off contacts of the hold magnet of the originating tertiary switch, for example, the contacts $THM20^1$ to $THM20^3$ associated with the magnet THM20, as shown in FIG. 7. Now assuming, for instance, the originating secondary link consisting of the lower three wires of the level 9 of the secondary switch 0 in FIGS. 11 and 12 is connected via level 0 of the originating tertiary switch 2 in FIGS. 7 and 8 to the originating register 0 in FIG. 8, then the contact $b$ in the originating register 0 operates during the originating register 0 is in busy condition and holds the holding magnet THM20 (in FIG. 7) of the originating tertiary switch. Moreover, the holding magnets of both the primary switch and the secondary switch (not shown) of the line link frame are held by the normally-off contact THM20$^1$ of the hold magnet THM20. While, the normally-off contacts THM20$^2$ and THM20$^3$ split the channel from the subscriber line to the originating register and the channel from the originating register to trunk link frame. The latter channel is used for various controlling purposes but is not concerned to the principal feature of the present invention so that there will be no further explanation about this channel. When the originating register has completed its function and releases itself, by the release of the contact $b$, the hold magnet THM20 of the originating tertiary switch is released and the originating secondary link is switched to the trunk link frame via the normally-off contacts THM20$^2$ and THM20$^3$. At this moment contact THM20$^1$ switches continuously and extends the circuit holding the channel through the primary and secondary switches of the line link frame, to a succeeding trunk, for example, a terminating trunk via the trunk link frame.

Three six-wire crossbar switches, each having ten horizontals, twenty vertical paths and six make contacts in each crosspoints, are used as six-terminating tertiary switches. Therefore, each terminating tertiary switch has sixteen horizontals, ten verticals and three make contacts in each crosspoints by splitting the crosspoints. For a detailed explanation of the splitting method of the crosspoints, reference may be made to "160-Trunk Incoming Frames," Bell Laboratories Record, January 1942, page 114.

The manner in which such a line link frame operates, that is, how the line marker which is the controlling means controls the line link frame, is easily understood by those skilled in the art so that there will be no further detailed explanation hereinafter. Generally speaking, the operation of the line link frame and line marker can be carried out by the process similar to that described in United States Patent No. 2,585,904, "Crossbar Telephone System" A. J. Busch patented on February 19, 1952.

In such line link frames, the reason why the efficiency of the originating trunks is improved and accordingly, why it is effective to the saving of succeeding apparatuses will now be explained. Referring to FIGS. 1 and 2, for instance, assuming the case that under the control of the line marker 6 the subscriber 100 will be connected with a certain idle originating register which belongs to the originating tertiary switch OTSW0, there are twenty channels, consisting of five combinations, if all of them are idle and available for interconnecting the subscriber and the originating register. One of such combinations is that of the two primary links PL00 and PL01, and the two originating secondary links OSL00 and OSL01. These links provide four available channels. Therefore, if either one of the above primary links and either one of the above originating secondary links are idle, the line marker 6 can select a channel via the originating secondary switch OSSW0. This is similar as to each of other originating secondary switches OSSW1 to OSSW4. In other words, as each secondary link can be used at higher efficiency, more traffic can be handled for smaller number of the links. In addition, since originating trunks are, as already described, connected to secondary links, the number of the trunks can be reduced. Further, the number of primary switches in each trunk link frame succeeding to the trunks, can also be reduced.

On the other hand in the case of terminating connection, for example the interconnection of the terminating trunk 3 and the subscriber 100, there is only one available channel per each of the terminating secondary switches TSSW0 to TSSW9, such as the channel consisting of the primary link PL00 and the terminating secondary link TLS00. This serves to restrain the unreasonable increase of the number of terminating secondary switches.

It is to be understood that the above-described embodiment is merely illustrative of the application of the principle of the invention. Various other modifications may be made by those skilled in the art without departing from the spirit and scope of the invention.

What I claim is:

1. A switch frame for a cross bar switching system, comprising a first group of switches, a second group of switches, each of said first group of switches being horizontally divided into a first and second part, said second part being vertically divided into subswitches, said second group of switches being divided into a first and second group, links connecting said first part of said first group of switches to said first subgroup, and links connecting said subswitches to said second subgroup.

2. A switch frame according to claim 1 wherein some of said links have link extensions, respectively, being connected to the trunks in said crossbar switching system.

References Cited by the Examiner

UNITED STATES PATENTS

| | | | |
|---|---|---|---|
| 2,777,015 | 1/1957 | Jacobaeus et al. | 179—22 |
| 3,017,465 | 1/1962 | Gibson | 179—22 |
| 3,185,773 | 5/1965 | Engeman et al. | 179—22 |

KATHLEEN H. CLAFFY, *Primary Examiner.*

WILLIAM C. COOPER, *Examiner.*